DYED IMAGE XEROGRAPHY

Filed Aug. 3, 1961 3 Sheets-Sheet 1

INVENTOR.
WILLIAM E. BIXBY

BY Stanley Z. Cole

ATTORNEY

Dec. 12, 1967 W. E. BIXBY 3,357,830

DYED IMAGE XEROGRAPHY

Filed Aug. 3, 1961 3 Sheets-Sheet 2

INVENTOR.
WILLIAM E. BIXBY

BY Stanley Z. Cole

ATTORNEY

DYED IMAGE XEROGRAPHY

Filed Aug. 3, 1961 3 Sheets-Sheet 3

INVENTOR.
WILLIAM E. BIXBY

BY Stanley Z. Cole

ATTORNEY 3,357,830

DYED IMAGE XEROGRAPHY

William E. Bixby, Deerfield, Ill., assignor, by mesne assignments, to Xerox Corporation, Rochester, N.Y., a corporation of New York Filed Aug. 3, 1961, Ser. No. 129,167
18 Claims. (Cl. 96—1.2)

This invention relates to color printing and, in particular, to color printing using xerography.

While tremendous efforts are being made to improve color printing from full-color originals, many difficulties are continually encountered and there are many major obstacles that have not been overcome. The present art of color reproduction requires complex and expensive equipment as well as costly materials. Color reproduction prints made by present methods generally suffer from color imbalance. In making a color reproduction, small deviations in reproducing the shadings of the original image are reflected in the color combinations of the reproduction. Thus, color hues are frequently formed which bear no apparent relation to colors in the original image. While the photographic art has progressed a long way toward good color reproduction, economy and high quality remain as real problems.

Work is being done in the art of xerography applied to reproducing color images. The approaches in xerography may be considerably different, from those in photography where the color problems are distinct, and lend themselves to solutions not available in the photographic arts.

One problem in color printing is presented by the difficulty of obtaining pigments that will faithfully reproduce the original colors. In known xerographic methods, it is a usual requirement that the pigments intended for development be useful as a component of the toners for developing xerographic images. This requirement imposes standards of size, color, uniformity, triboelectric properties and the like, thus limiting the selection of color media. Still a further problem in known xerographic methods is that the color image must be formed on the surface of a xerographic plate and either fused to the plate or transferred to another surface. Each of these raises difficulties in yielding the different shades with good fidelity.

Now in accordance with the present invention, there are disclosed novel methods and means of reproducing an original. Further as carried out, as described hereinafter, a full-color original is produced by utilizing xerographic procedures which overcome problems of color reproduction present in known systems. Thus, it is an object of the invention to define novel methods, means and apparatus for forming reproductions of originals.

It is another object to define novel methods and means for printing full-color reproductions.

It is a further object of this invention to devise novel methods of color reproduction in xerography.

It is a still further object of this invention to devise novel xerographic apparatus for color printing.

Further objects and features of the invention will become apparent from the following description when read in connection with the drawings, wherein:

FIGS. 1 to 7 are simplified diagrams showing embodiments of basic apparatus for producing color reproductions in accordance with the invention. These embodiments, while basic in nature, necessarily include specific features which are not to be interpreted as limiting, but are intended to include the various usual alternatives for performing similar functions.

Figure 1:
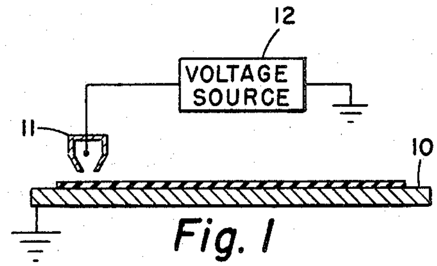
FIGS. 1 through 7 are diagrammatic illustrations of an embodiment of flow steps of this invention as carried out in simple apparatus embodiments.

In FIG. 1 xerographic plate 10 is charged by electrostatic charging device 11 energized by voltage source 12 so that a static potential level is produced on the surface of plate 10 between approximately 100 and 300 volts and preferably of about 150 to 200 volts. This voltage is chosen to give adequate image density while maintaining a wide density range. Higher voltages increase density but decrease density range or "grey scale" range. It should be appreciated, however, that other voltages may be used depending, for example, on the plate and other factors known to those skilled in the art. Xerographic plate 10 is characterized as having essentially panchromatic characteristics. Such plates are described, for example, in U.S. Patents 2,745,327, 2,803,541, 2,803,542, and 2,937,944. Charging device 11 is depicited as a corona discharge device but is intended to include any form of electrostatic charging device capable of producing the desired charge uniformity and level. Similarly, although charging is illustrated in this figure, it is intended to merely accomplish sensitization of the plate, and this may be done in any of the ways known to those skilled in the art.

Figure 2:
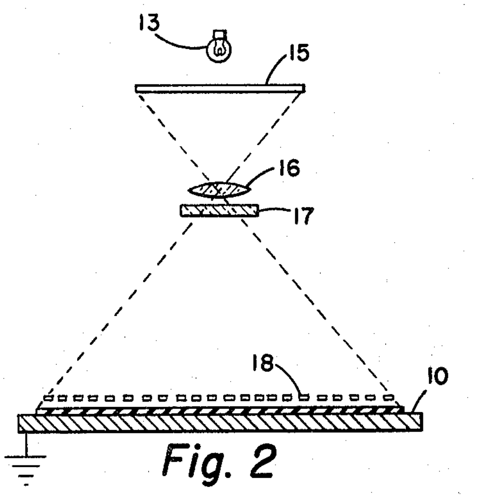

In FIG. 2, the sensitized xerographic plate 10 is exposed to an illumination pattern produced by illumination of an original 15 to be reproduced by source 13 depicted as an incandescent bulb but including any source of essentially while light or any light source that will illuminate in the colors of a particular color separation desired. Illumination of plate 10 in accordance with image original 15 is made through lens 16, filter 17 and halftone screen 18. Image 15 is a full-color image to be reproduced, and while illustrated as a transparency in a preferred embodiment, it is intended to include opaque color prints from which illumination can be reflected. Filter 17 is a color filter for separating out an image corresponding to a given color. Halftone screen 18 is a dot or line screen of between approximately 50 to 400 lines per inch and in one embodiment is about 150 lines per inch. This screen is utilized to translate light intensity into size variations of dots or lines depending on the screen. Thus, screen 18 may appropriately be a hard-dot screen spaced slightly from the sensitive surface or it may be a soft-dot contact screen. In the case of halftone originals, a screen may be unnecessary.

Figure 3:
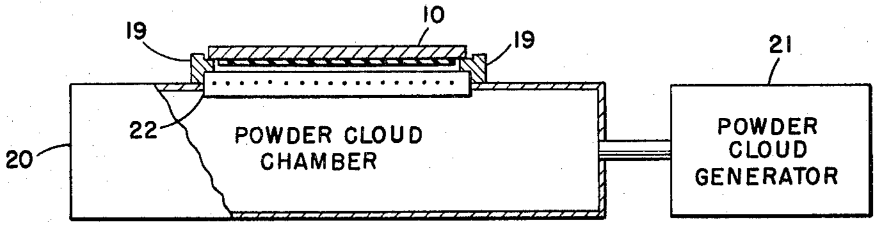

After exposure in accordance with FIG. 2, development of the exposed plate 10 is performed by any known xerographic development procedures such as cascade development in which electroscopic particles are cascaded across the electrostatic latent image on the xerographic plate, liquid development in which a liquid carrying a suspension of electroscopic particles is presented to the surface carrying the electrostatic latent image, transfer development in which a sheet carrying a layer of electroscopic particles is placed in contact with the electrostatic latent image or by other appropriate methods including powder cloud development which is illustrated in FIG. 3 and is a preferred embodiment. Charged or uncharged area development is contemplated. Thus, while positive originals are generally discussed herein using uncharged area development, negative originals may be used for exposure followed by direct or charged area development.

As shown in FIG. 3, in powder cloud development the latent image-bearing plate 10 is placed on supports 19 adjacent to an opening in a powder cloud chamber 20. A powder cloud generator 21 supplies an aerosol of fine electroscopic particles into powder cloud chamber 20 from which the aerosol cloud is presented to the latent image on xerographic plate 10. Preferably a development electrode 22 comprising a wire screen or a screen of perforated sheet metal is positioned in close proximity to the xerographic plate so that the electroscopic particles are fed through the screen mesh to the plate. The electroscopic particles are characterized as impermeable to dye solutions, which are to be used for printing, and preferably are a resin blend toner such as disclosed in Rheinfrank, U.S. Patent 2,788,288.

Following development the developed image is transferred; and as will appear more fully below, transfer is accomplished a plurality of times to the transfer web, and therefore, it is desirable that means to accomplish accurate registration be built into the system.

Figure 4:
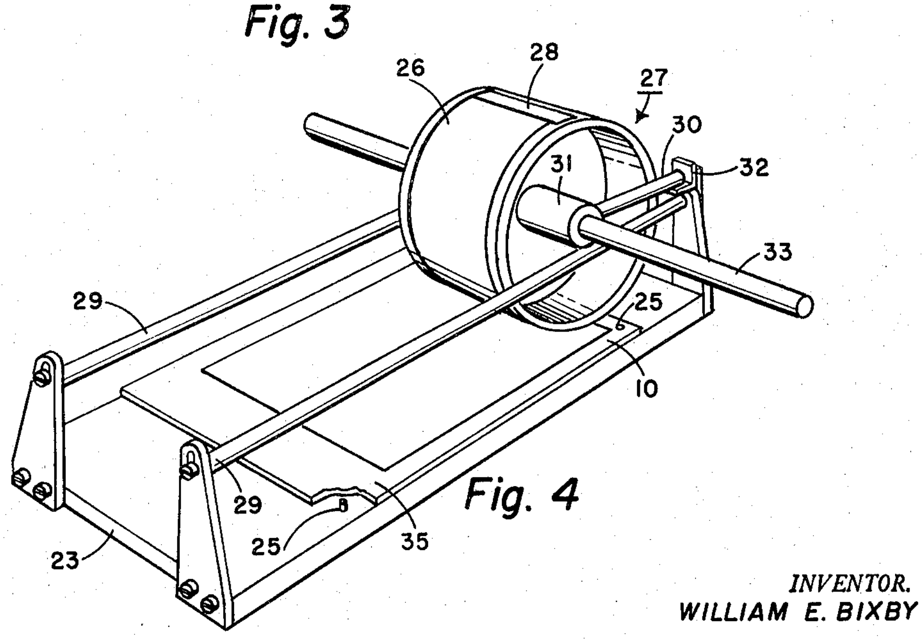

FIG. 4 shows a device depicted in some detail for better understanding but intended to represent an embodiment of a transfer device capable of achieving the required registration accurately in consecutive transfers. In this device, developed plate 10 is placed on base 23 having at least two register pins 25. Notches or holes are contained in plate 10 corresponding with register pins 25 to enable accurate positioning of plate 10 on base 23. Transfer is accomplished in this invention to a color absorbent member 26, which is fastened tautly and securely to metal cylinder 27.

Color absorbent member 26 generally comprises a hydrophilic layer or coating on a base material. Generically, the coating is a hydrophilic layer that swells and softens, but does not dissolve upon moistening or soaking with water. Included in this class are cellulose and non-cellulosic materials such as gelatin, hydrophilic or water swellable plastics and the like. Although the invention is not limited to a specific hydrophilic layer, it will be described hereinafter in terms of a gelatin layer as one embodiment without necessary limitation thereto. The gelatin layer or coating may be prepared in a number of ways. One preferred method of preparation is to add to a 5% gel solution saponin to act as a spreading agent, and formaldehyde which acts as a hardening agent. One commercially produced material which has been found to work successfully as a transfer member is Kodak Dye Transfer Paper Type F Glossy. This commercial product carries the same emulsion as double-weight glossy photographic paper, except that the silver salts are omitted, and as indicated, such a coating on the proper material will produce a valuable transfer member. Any material capable of being coated with a gel solution is a suitable base material for the color absorbent member. This includes but is in no way limited to paper, film, glass, cloth, synthetic materials, and the like. In some instances before the gel solution is applied, the base material is prepared to take the layer; however, generally no such preparatory steps must be taken.

The paper or other member is stretched tautly on the cylinder to assure registration in the consecutive transfers and in any other subsequent process steps. The member is fastened to the cylinder by a pressure-sensitive tape 28 or other suitable fastening means such as hooks or clamps. As illustrated in FIG. 4, transfer cylinder 27 is restricted from lateral movement by guide rails 29 and has a positioning pin 30 attached to axial support portion 31 of the transfer cylinder for accurate positioning of the cylinder with respect to plate 10. In operation plate 10 is placed in engagement with register pins 25 and transfer cylinder 27 is disposed between guide rails 29 and in a position exactly engaging positioning pin stop 32 with positioning pin 30. The color-absorbent paper on the cylinder is then rolled across and in contact with plate 10 by means of axle 33. In a preferred embodiment, a direct conductive connection exists between conductive backing 35 of plate 10 and metal transfer cylinder 27 to provide electrical conditions suitable for transfer. However, other appropriate connections may include a biasing potential source between transfer cylinder 27 and plate backing 35.

For top quality reproductions it has been found important to achieve a maximum transfer of the developed image to the color-absorbent paper. One procedure which has been successfully utilized for a maximum transfer comprises electrostatically charging the developed image surface before transferring and is described in U.S. patent application, Ser. No. 654,950 filed Apr. 24, 1957, now U.S. Patent No. 3,004,860. In using this transfer procedure in the present invention, plate 10 carrying a developed image is placed in the dark and electrostatically charged as by the corona discharge device 11 illustrated in FIG. 1. The electrostatic charge is preferably the same as used for sensitizing the plate so that the polarity and voltage level is compatible with the particular plate material. However, it must be borne in mind that some plates will sustain a charge of either positive or negative polarity and the charge level can vary widely as it can in sensitizing for latent image formation. The essential requirements are that the insulating surface of plate 10 and the developed image particles on that surface be substantially uniformly charged. The insulating surface of plate 10 must be maintained in the dark until the transfer has been accomplished so that no photoconductivity will allow charge leakage to the back of the plate. In transferring, metal transfer cylinder 27 bearing color-absorbent paper 26 is directly conductively connected to backing 35 of plate 10. When the transfer cylinder is rolled across the image-bearing surface of plate 10, the charged developed-image particles are electrically attracted to the color-absorbent paper. As disclosed in the above-cited application Ser. No. 654,950, the transfer member is preferably conductive for this transfer process. Adequate conductivity is inherent in usual dye transfer papers for this purpose. However, it is sufficient if the color-absorbent paper used with this particular transfer process be substantially conductive relative to the insulating surface layer of plate 10.

Figure 5:
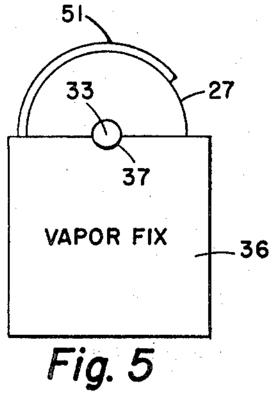
Figure 6:
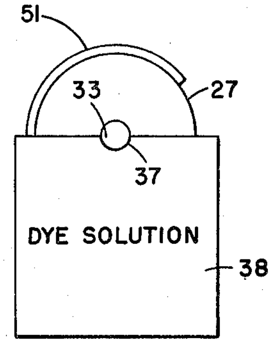

In order to assure adherence of the image of electroscopic particles transferred to the color-absorbent paper 26, it is fixed to the paper. The fixing apparatus is depicted in FIG. 5 as tank 36 upon which transfer cylinder 27 is suitably supported as by notch 37 shaped to carry axle 33. Tank 36 contains a solvent vapor such as trichloroethylene vapor or may contain heating elements such as infrared elements or thermal wire elements. Cylinder 27 is rotated to carry the color-absorbent paper into the tank where the solvent vapor or heat causes the particles of the particulate image to liquefy and fix to the paper. On evaporation of the solvent vapor or on cooling after heat fixing, the image will be fixed or fused to the paper. After fixing, the cylinder is transferred to coloring apparatus depicted as a second tank 38 containing a pigmented solution such as a solution of one of the dyes conventionally used in a subtractive color process. The color used will depend upon the color filter used in the exposure step illustrated in FIG. 2. If a red filter was used with a positive image original and the xerographic plate was developed by deposition of electroscopic particles attractable to the uncharged areas, an appropriate dye would be cyan. The cyan dye is imbibed into the surface layers of the color-absorbent paper only in the areas not coated with the fixed image.

Figure 7:
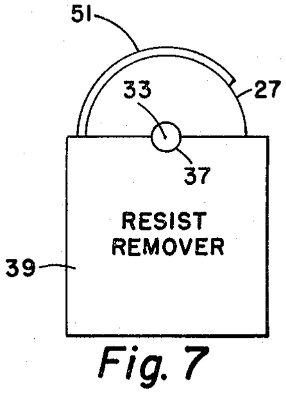

Following the color application, the cylinder may then be rinsed of the dye solution and placed in apparatus depicted as a third tank 39, shown in FIG. 7 for effecting the removal of the fixed image. Tank 39 contains a solvent for the fixed image or particulate material of the image. This solvent may suitably be liquid trichloroethylene.

After removal of the fixed image from the dye-transfer paper, the paper is rinsed with a clean solvent, dried and is then ready for a second transfer of an electroscopic particulate image made with a second color separation filter such as a green filter. The steps of transferring the electroscopic particulate image to the color-absorbent paper, fixing the image, dyeing the paper, and removing the fixed image are then repeated using magenta dye. The color printing process is then completed by repeating the sequence once more using a blue filter during exposure and a yellow dye.

Figure 8:
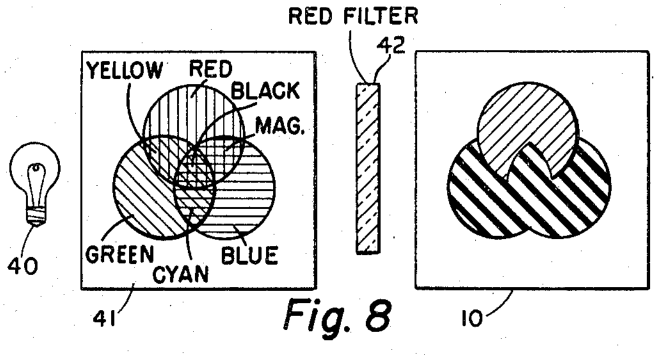
FIGS. 8 through 11 are diagrammatic representations illustrative of an embodiment of process flow steps in accordance with the invention.

FIGS. 8 through 11 have been included for a clear explanation of the operation of the process. FIG. 8 shows light source 40, transparent color positive 41 comprising a conventional color illustration of three overlapping circles of the primary colors, red, green and blue. Between color positive 41 and sensitized xerographic plate 10, red filter 42 is positioned. The red filter blocks all illumination other than red from reaching xerographic plate 10. As a result, plate 10 is illuminated only where the red circle is in the original and in the area around the three circles corresponding to transparent areas passing all light including red light in the original. It may also be noted that the small segment in which all three colors overlapped is essentially black and does not pass any light and so is unilluminated in the xerographic plate.

Figure 9:
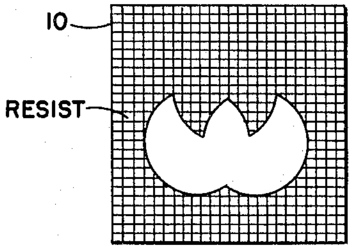

FIG. 9 shows the xerographic plate developed by reversal development so that all illuminated or uncharged areas received electroscopic particles. Since these electroscopic particles are of a plastic material impermeable to conventional dye solutions, they may be considered and will hereafter be referred to as a dye resist.

Figure 10:
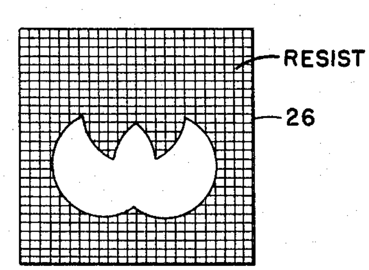

In FIG. 10 color-absorbent paper 26 is illustrated after transfer thereto of the dye resist image.

Figure 11:
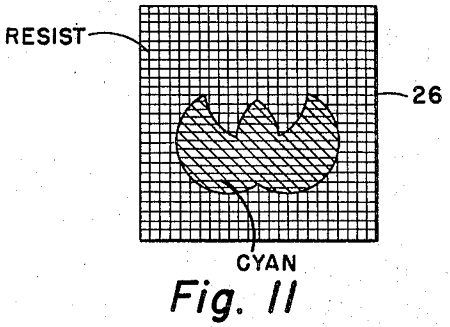

In FIG. 11 the color-absorbent paper is illustrated after it has gone through a solution of cyan dye. The cyan dye coats and is absorbed in all areas that are not covered by the resist pattern which may be all areas not illuminated in the exposure. The technique of coloring areas other than those represented by illumination from the original is known to the art as a subtractive process. Using this process for producing color prints, two further cycles use green and blue filters respectively for exposure and magenta and yellow dyes respectively for colors.

In the following color printing apparatus, it will be assumed that xerographic techniques have been utilized to produce the proper powder image on the plate, and it will be assumed further that color-separated images have been produced.

Figure 12:
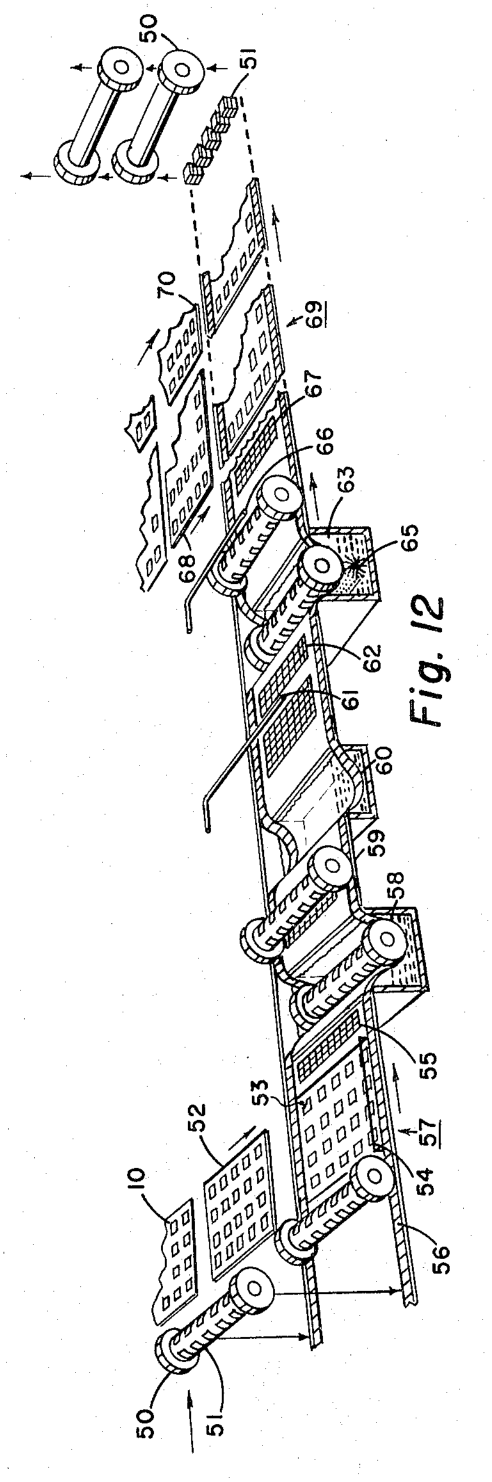
FIG. 12 is a diagrammatic representation of cylinder-fed printing apparatus in accordance with an embodiment of the invention.

Thus, in FIG. 12 a simplified illustration of a color-printing apparatus is shown. The apparatus in FIG. 12 is based on a series of cylinders 50 carrying dye transfer paper 51 through all of the necessary processing steps. Sheets of dye transfer paper, the size of the final prints desired, are given preliminary soaking in water, wiped to remove any excess water, and then affixed to a cylinder. This preliminary soaking, wiping and affixing may be done by any suitable means which, because of the simplicity of understanding, are not illustrated. The paper does not have to be positioned precisely on the cylinder; it merely must retain its affixed position on the cylinder after being attached in a general area. By soaking the paper in water prior to fastening it to the cylinder, the gelatin and paper base are swelled so that the paper, when fastened tautly to the cylinder, will remain taut. Experiments have shown dimensional stability of the paper will be maintained through the process stations.

After cylinders 50 have been loaded with paper 51, they can be kept in a humidified storage chamber until demanded by an automatic feeder as indicated at the left of the system illustrated in FIG. 12. Twenty sheets of paper are shown attached to the cylinder; but it will be recognized that by increasing the cylinder's length, diameter, or both, additional print papers can be accommodated on each cylinder.

Twenty xerographic plates bearing powder images, produced after exposure to twenty different color originals through a green filter, are positioned on conductive plate 52 in engagement with twenty sets of register pins 53 protruding from it. It should be understood that variations from this number may be used and that the showing is for illustrative purposes only. Corona wire 54, shown at the near edge of the conductive plate positioned in the transfer station 57 is connected to a high voltage source (not shown) and is caused to traverse the xerographic plates positioned on the conductive plate. Cylinder 50 is then rolled across the plate bearing the powder images, and the powder images thereby transferred from xerographic plates 10 to the individual sheets of dye transfer paper 51. Corona charging of the developed xerographic plates before transfer has been found to improve the quality of transfer for a system in accordance with the present invention. After transfer, cylinder 50 passes over hot air jet station 55 which dries the surface of the dye transfer paper superficially. The cylinder then rolls on guide rails 56 into chamber 58 containing a suitable solvent vapor to fix the powder images. A preferred vapor for this purpose is trichloroethylene. Other solvent vapors such as amyl or butylacetate, butyl alcohol or perchloroethylene, well known in the art, may also be used. Using trichloroethylene vapor, cylinder 50 preferably remains in the vapor chamber approximately 30 seconds, but as is known in the art, shorter or longer periods may be used. The length of time required for fixing is determined largely by the water moisture present on the surface of the paper. The drier the surface, the shorter the period of time required for adequate fixing. Fixing converts the powder image to a resin film that is impervious to water or is a resist to aqueous dye solutions. The cylinder is then rolled along the guide rails through a second hot air jet station 59 and then into a magenta dyeing station 60. Using conventional dye transfer papers, the cylinder is passed through this station at a speed permitting the cylinder to remain in the bath for approximately 15 seconds. After the dye bath, the cylinder passes through a clear water rinsing station 61 to remove excess dye and then through another hot air jet station 62 where the paper is again superficially dried. The cylinder moves next into resist-removing station 63 where a light brushing by rotary brush 65 along with a solution of solvent, of a type such as used to produce the vapor for fixing, quickly removes the resin dye resist from the paper. Clear solvent rinse station 66 is next, followed by quick-drying hot air jet station 67. This completes the first cycle and cylinder 50 rolls on to the next transfer station where xerographic plates that have been processed using a red separation filter are arranged. Xerographic plates processed from the same original image are placed in the same relative position in the second array as that occupied in the first array. Care is taken to register the position of array 68 of xerographic plates precisely with reference to the circumference of the cylinder so that the first dye images on the cylinder will meet in precise register with the second color-separated resist images. The necessary indexing to transfer station 69 is provided by engaging transverse grooves in the ends of cylinder 50 and in guide rails 56. Processing in this second cycle proceeds as in the first cycle with the exception that a cyan-dyeing station (not illustrated) is used. A third cycle similar to the first and second follows with array 70 of xerographic plates carrying powder images from a blue filter exposure and with a yellow dye bath (not illustrated). Following emergence of the cylinder carrying the fully-colored prints from the final drying hot air jet station, the finished prints 51 are stripped from cylinder 50 and are ready for trimming. The cylinder is then returned to the starting point where clean sheets of paper are attached for another cycle.

Obviously, several cylinders can pass through the apparatus simultaneously. In fact, separate cylinders can occupy each of the apparatus stations at any given time. In such apparatus, the slowest processing station governs the speed of the entire apparatus. Thus, it is contemplated that this apparatus may be designed for faster operation by designing the slowest processing station so that it will accommodate more than one cylinder at a time. Thus, the vapor fusing chamber 58 can be made long enough to accommodate two or three cylinders at one time.

Figure 13:
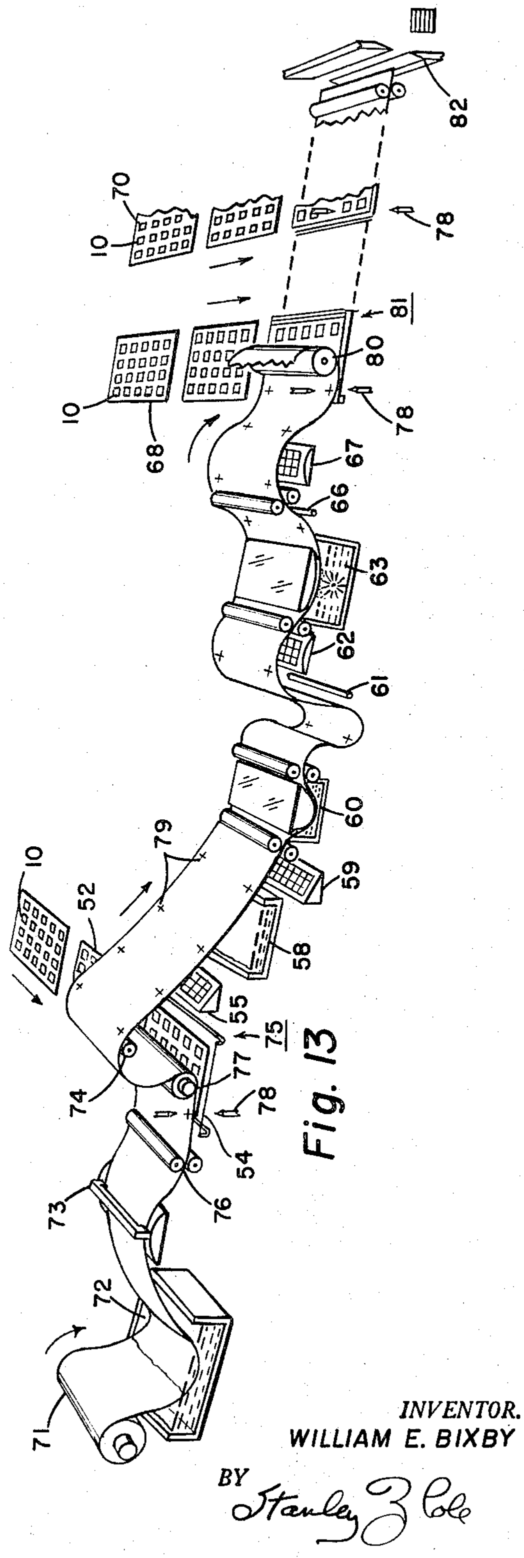
FIG. 13 is a diagrammatic representation of an embodiment of a continuous web-fed printing apparatus in accordance with the invention.

A second color print processing apparatus utilizing a continuous web or sheet of dye transfer paper is illustrated in FIG. 13. In this apparatus the individual stations correspond almost identically with the stations of the cylinder-fed apparatus. However, certain handling details are quite different. Dye transfer paper 71 is supplied in roll form and is shown at the extreme left of the drawing. The paper passes through moistening means 72 which may comprise a liquid containing trough preferably containing water. Paper 71 is then moved under squeegee 73 where excess moisture is removed as it leaves moistening means 72. The paper approaches the image transfer station 75 under the control of drive rollers 76. The image transfer station, as with the previous apparatus, consists of an array 52 of xerographic plates 10 bearing powder images resulting from exposures to the color original through a green filter. Again, a specific number of plates is used as a means of illustration, and wide variations from this number may be employed. Transfer of the image is made in a similar manner to that described in the cylinder-fed apparatus. However, the paper must move with an intermittent motion during this stage. While corona charging unit 54 is passing over the array of xerographic plates, the paper is held away from the array of plates by suitable raising and lowering means 74. Following the charge, the paper is lowered so as to contact the extreme left edge of the array of plates. Now with the paper firmly held at this edge, roller 77 brings the remainder of the paper over the array of plates and into contact with them. At this point, register marking device 78 marks or punches register points 79 in the paper at precise positions relative to the array of plates. Roller 77 is then lifted away from the paper and the entire area of the paper resting on the array of plates is lifted vertically and resumes its linear continuous motion through the remainder of the first cycle. This includes hot air jet station 55, vapor fusing station 58, hot air jet station 59, magenta dyeing station 60, rinsing station 61, hot air jet station 62, resist-removing station 63, solvent rinse station 66 and hot air jet station 67.

The paper is then moved to the second array 68 of xerographic plates 10 at transfer station 81 where it follows the same type of intermittent motion used in the first transfer station 75. In addition, a detection device such as a photo-electric eye device detects register marks 79 on the paper and controls the operation of the transfer to obtain exact registration with this second array of powder images. When aligned correctly, transfer roll 80 moves across the array of plates bringing the paper into contact with the plates exposed through the red filter. After this second transfer, the paper is lifted from the plates and again advanced in its linear motion through the remaining stations of this cycle. As in the previous apparatus, a cyan dyeing station is included in this second cycle. At the third image transfer station, a detection means again operates to take control of the motion of the paper and position it in register on array 70 of plates exposed through the blue separation filter. Following transfer, the paper passes through the remaining stations of the third cycle which includes a yellow dyeing station. The finished prints are then cut into individual prints by cutter 82.

A further embodiment of the present invention enables multiple copying of the same original in color with only one xerographic process for each of three color separations. In accordance with this embodiment, the basic image formation and transfer steps, as described in relation to FIGS. 1, 2, 3 and 4, are performed for each of three primary color separations of the original to be reproduced. In the transfer step the color absorbent paper 26 is replaced with a sheet of matrix material suitable for dye transfer work. Dye-transfer paper itself would be suitable if it did not contain a mordant. The developed images of dye-resistant particles are fixed to the matrix material as in FIG. 5 and are then ready for use in multiple dye-transfer operations. To make a final full color reproduction the image-carrying matrix sheets for each of the three primary color separations are coated with appropriate dyes for a subtractive color process and then dye transfers are made in register to a singe dye-transfer paper. When the dye is applied to the matrix material, it is repelled from the areas coated by the dye-resistant image material. On dye transfer the dye-transfer paper receives the color only in areas not adjacent to the dye-resistant image material on the particular matrix sheet. The three matrix sheets carrying the color separated images may be repeatedly dyed and used for dye transfers in register to make numerous copies without going back to the xerographic steps. The dye-resistant images always remain on the matrix sheets to which they are originally transferred, and no removal by a solvent wash is necessary. After the dye resist images are formed on the matrix sheets the following dye procedures may be performed in the light; and whereas conventional dye-transfer commonly uses photosensitive matrices, the matrices for this embodiment of the present invention require no photosensitivity enabling greater handling ease, extending the usable lifetime and reducing material cost. The second transfer step of the process in this embodiment would produce a left-to-right or "minor" reversal in the absence of corrective measures. Correction may be made by several known procedures and can readily be made in the exposure to the original image by a modification of the basic arrangement illustrated in FIG. 2. For example, the optical system for projection may include a left-to-right reversal by known means, or plate 10 may be adapted to produce a direct reading image. To produce a direct reading image a xerographic plate is commonly made with a NESA glass backing and then exposure is made through the backing producing a direct reading latent image on the free or non-adjacent surface of the photoconductive layer. Other known procedures for obtaining a direct reading final image may be utilized without exceeding the scope of the present invention.

While the various embodiments of the invention discussed above have been discussed in relation to full-color reproductions, the invention is not intended to be limited thereto. Monochrome reproduction can be made in accordance with the inventive concepts by utilizing only one of the three process steps in the cycle necessary to produce full color.

Various other possibilities are apparent, and it is intended to cover the invention broadly within the spirit and scope of the appended claims.

What is claimed is:

1. A method of image reproduction comprising forming through xerography a powder reproduction on a dye receptive surface of an original to be reproduced, fusing the powder to form a resist pattern, and applying a dye to said fused powder bearing surface for absorption of said dye at uncovered points along said surface.

2. A method of image reproduction according to claim 1 in which said powder comprises a particulate resin blend of electroscopic material.

3. A method of image reproduction according to claim 1 in which said dye receptive surface includes a gelatin layer.

4. A method of xerographic image reproduction comprising forming an electrostatic latent image corresponding to an original to be reproduced on a surface adapted to carry such an image, developing said latent image with electroscopic particulate material which when fixed acts as a dye resist to form a resist pattern of the latent image, transferring said resist pattern to a transfer medium capable of absorbing dye solution in saturated color, fixing said particulate material on said transfer medium, and applying a dye solution to the transfer medium so that it is absorbed or resisted in accordance with the original to be r. produced.

5. A method of image reproduction comprising forming through xerography on a dye receptive surface a powder reproduction of an original to be reproduced, fusing the powder to form a resist pattern, applying a dye to the resist pattern bearing surface for absorption of said dye at uncovered points along said surface, and removing said resist pattern from said surface.

6. A method of image reproduction comprising forming through xerography on a dye receptive surface a first powder reproduction corresponding to a first separation of an original to be reproduced, fusing the powder to form a first resist pattern, applying a first dye to the resist pattern bearing surface coloring the unprotected areas, removing said resist pattern from said surface, forming in register through xerography a second powder reproduction corresponding to a second separation of said original on said surface, fusing the powder to form a second resist pattern and applying a second dye to said second resist pattern bearing surface coloring the unprotected areas and removing said second resist pattern from said surface.

7. The method of claim 6 in which the first and second powder reproductions are reproductions corresponding to first and second color separated images of the same multicolor original.

8. A method of image reproduction comprising a plurality of image formation and coloration cycles wherein each cycle comprises forming on a dye receptive surface a xerographic powder reproduction of a different separation of an original to be reproduced, fusing the powder to said surface to form a resist pattern, applying in each cycle a different colored dye to the resist pattern bearing surface for absorption of said dye at uncovered points along said surface and removing said resist pattern from said surface to provide a multicolored image.

9. A method of image reproduction according to claim 8 in which the plurality of image formations correspond to color separation images of a single original and in which said surface in each of the plurality of cycles is the same surface and in which each cycle is in register with each other cycle of said plurality of cycles.

10. A method of image reproduction according to claim 9 in which the dye applied in each of the plurality of cycles is complementary in color to the color separation to which the image formation corresponds.

11. A method of reproducing a color original in full color comprising separating the color original into first, second, and third color separations representing first, second and third colors in the original, xerographically forming resist images corresponding to each of the color separations, transferring the resist image of the first color separation to a color-absorbent paper, applying a first complementary color complementary to said first color to the paper so that it is absorbed in the areas not protected by the resist image, removing the resist image, transferring the resist image of the second color separation to the color-absorbent paper in register, applying a second complementary color complementary to said second color to the paper so that it is absorbed in the areas not protected by the resist image, removing the resist image, transferring the resist image of the third color separation to the color absorbent paper in register, and applying a third complementary color complementary to said third color to the paper so that it is absorbed in the areas not protected by the resist image.

12. A method in accordance with claim 11 in which the first, second, and third colors in the original are red, green and blue respectively and in which the first, second, and third complementary colors are cyan, magenta and yellow respectively.

13. A method in accordance with claim 11 in whch the color separations are photographically separated transparencies of the original and in which the resist images are xerographic images made by exposure to the color separated transparencies and in which development is with a resin blend powder.

14. A method in accordance with claim 11 in which the color is in the form of an aqueous dye solution and the color absorbent paper includes a gelatin layer.

15. A method according to claim 11 in which the color separations are electrostatic latent images produced on a xerographic plate by sensitizing the plate and exposing it to illumination from the full color original as modified by color separation filters.

16. A method according to claim 15 in which the color filters used for the first, second and third color separations are respectively red, green and blue filters.

17. A method for monochromatically reproducing an image in a halftone reproducton with highly saturated color comprising xerographically forming an electrostatic latent image of the original to be reproduced by exposure through a halftone screen, developing the non-image areas with a dye resist, transferring the developed pattern to a dye absorbent layer, fusing said developed pattern and applying a high saturation dye to the layer through the developed pattern.

18. The process of making multiple color reproductions comprising forming latent electrostatic images conforming to each of three primary color separations of an original to be reproduced, developing said latent electrostatic images with an electroscopic resin powder, transferring each of the developed images to a separate sheet of dye receptive matrix material, fusing the developed images to the matrix material to form dye-repellent image patterns on each sheet of said matrix material, dye-coating each of said sheets of matrix material with an appropriate dye for a subtractive color process so that the dye is accepted only in the non-image areas, dye-transferring the dye from each of said sheets of matrix material in register to a single sheet of dye-transfer paper forming a full color reproduction of the original, and repeating said dye-coating and said dye-transferring steps a plurality of times to produce a plurality of full-color reproductions of the original.

References Cited

UNITED STATES PATENTS

| | | | |
|---|---|---|---|
| 15,959 | 10/1856 | Derby | 8—65 |
| 159,166 | 1/1875 | Edwards | 101—149.4 |
| 2,297,691 | 10/1942 | Carlson | 96—1 |
| 2,843,499 | 7/1958 | Andrus | 117—17.5 |
| 2,919,179 | 12/1959 | Van Wagner | 96—1 |
| 2,939,787 | 6/1960 | Giaimo | 96—1 |
| 2,946,682 | 7/1960 | Lauriello | 96—1 |
| 2,947,625 | 8/1960 | Bertelsenq | 96—1 |
| 2,949,849 | 8/1960 | Gundlach | 96—1 |
| 2,954,291 | 9/1960 | Clark | 96—1 |
| 2,956,875 | 10/1960 | Ulary | 96—1 |
| 2,968,553 | 1/1961 | Gundlach | 96—1 |
| 2,986,466 | 5/1961 | Kaprelian | 96—1 |
| 2,993,788 | 7/1961 | Straw et al. | 96—49 |

(Other references on following page)

UNITED STATES PATENTS

| | | | |
|---|---|---|---|
| 3,003,891 | 10/1961 | Albrecht | 101—149.4 |
| 3,052,213 | 9/1962 | Schaffert | 118—637 |
| 3,059,614 | 10/1962 | Limberger | 118—637 |
| 3,088,402 | 5/1963 | Newman | 96—1 |
| 3,132,050 | 5/1964 | Huber | 118—637 |

FOREIGN PATENTS

| | | |
|---|---|---|
| 203,907 | 11/1956 | Australia. |
| 337,073 | 10/1930 | Great Britain. |

OTHER REFERENCES

Focal Encyclopedia of Photography, Focal Press, New York (1956), pp. 230–233, 380–382.

NORMAN G. TORCHIN, *Primary Examiner.*

PHILIP E. MANGAN, *Examiner.*

G. H. BJORGE, A. L. LIBERMAN, C. E. VAN HORN, *Assistant Examiners.*